United States Patent
Ouimette

(10) Patent No.: US 10,147,058 B1
(45) Date of Patent: Dec. 4, 2018

(54) MONITORING SCHEDULE ADHERENCE OF CALL CENTER AGENTS

(75) Inventor: Jason P. Ouimette, Atlanta, GA (US)

(73) Assignee: NOBLE SYSTEMS CORPORATION, Atlanta, GA (US)

( * ) Notice: Subject to any disclaimer, the term of this patent is extended or adjusted under 35 U.S.C. 154(b) by 1100 days.

(21) Appl. No.: 13/606,725

(22) Filed: Sep. 7, 2012

(51) Int. Cl.
G06Q 10/06 (2012.01)

(52) U.S. Cl.
CPC .................. G06Q 10/06 (2013.01)

(58) Field of Classification Search
None
See application file for complete search history.

(56) References Cited

U.S. PATENT DOCUMENTS

| | | | |
|---|---|---|---|
| 5,991,390 A * | 11/1999 | Booton | H04M 3/5125 379/265.02 |
| 6,144,971 A | 11/2000 | Sunderman et al. | |
| 6,816,733 B1 * | 11/2004 | Dezonno et al. | 455/456.1 |
| 7,725,218 B2 | 5/2010 | Hamrick et al. | |
| 7,825,794 B2 | 11/2010 | Janetis et al. | |
| 8,683,547 B2 * | 3/2014 | Apparao et al. | 726/1 |
| 2002/0067272 A1 * | 6/2002 | Lemelson et al. | 340/573.4 |
| 2005/0008140 A1 * | 1/2005 | Bala et al. | 379/265.04 |
| 2006/0095315 A1 * | 5/2006 | Ano et al. | 705/11 |
| 2006/0105795 A1 * | 5/2006 | Cermak et al. | 455/518 |
| 2007/0015495 A1 * | 1/2007 | Winter et al. | 455/414.1 |
| 2007/0066322 A1 * | 3/2007 | Bahl | 455/456.1 |
| 2007/0124395 A1 * | 5/2007 | Edge et al. | 709/206 |
| 2008/0133127 A1 | 6/2008 | Havens | |
| 2008/0174485 A1 * | 7/2008 | Carani et al. | 342/357.07 |
| 2008/0255919 A1 * | 10/2008 | Gorder | 705/9 |
| 2008/0296364 A1 * | 12/2008 | Pappas et al. | 235/377 |
| 2009/0217076 A1 * | 8/2009 | Okuhara et al. | 713/600 |
| 2010/0161720 A1 * | 6/2010 | Colligan et al. | 709/203 |
| 2010/0287025 A1 * | 11/2010 | Fletcher et al. | 705/9 |
| 2011/0010184 A1 * | 1/2011 | Keren et al. | 705/1.1 |
| 2011/0015963 A1 * | 1/2011 | Chafle | G06Q 10/06 705/7.16 |
| 2011/0090085 A1 * | 4/2011 | Belz et al. | 340/573.1 |
| 2011/0112943 A1 * | 5/2011 | Dietz et al. | 705/32 |
| 2011/0199256 A1 * | 8/2011 | Chu | 342/357.25 |
| 2011/0307283 A1 * | 12/2011 | Johnson | 705/7.13 |
| 2012/0290311 A1 * | 11/2012 | Tara et al. | 705/2 |
| 2014/0058801 A1 * | 2/2014 | Deodhar | G06Q 10/0639 705/7.38 |

* cited by examiner

Primary Examiner — Deirdre D Hatcher

(57) ABSTRACT

An employee, such as a call center agent, is monitored for compliance with a work schedule based on their work location. The call center agent's physical location is periodically monitored by a schedule adherence system that includes a mobile device executing a mobile application. Location information associated with that agent is compared with location information when the agent is working during their scheduled shift. A significant deviation from the known location may be reported as a potential deviation from a defined work schedule for that employee. The call center agent can also be monitored prior to the beginning of a shift to determine if the agent will be arriving at work in time to begin their shift as scheduled. Substitute agents may be scheduled and notified in time to fill the position of the late agent.

13 Claims, 10 Drawing Sheets

MONITORING SCHEDULE ADHERENCE OF CALL CENTER AGENTS

BACKGROUND

Employees may work according to a work schedule that varies in respect to either shift times, work locations, or both. For example, service personnel, such as a plumber or service technician, may consistently start their work shift at approximately the same time each day, but may work at different work locations. The employee may work at a number of different work locations or job sites in a given day, or over several days each week. For example, a service technician may work a number of days or weeks at one location, and then begin work at another location for another number of days. Thus, the employee may start and end their work day at the same times, but work at different locations during a shift.

Other employees, such as call agents, may work their shift at a common work location, but their shift times may vary. Frequently, call centers may schedule agents to start their shifts at slightly different times on different days to accommodate forecasted call volumes and other agents' schedules. Thus, these employees work in the same location, but start and/or end their shift at different times.

An employer may have a number of employees assigned for various shifts based on various factors, including projected work volumes, employment contracts, and productivity goals. For example, a call center may schedule its agents to work certain shifts based on planned goals and customer commitments. Thus, employee adherence to a work schedule is important for employers to meet their goals.

Employees, however, may not always adhere to a work schedule. This can be manifested in various ways. In some instances, employee may arrive late to a job site to begin their shift. If the employee is a call center agent and the work location is in a call center, the absence of the employee can be easily noted, both visually by a supervisor and by monitoring the agent's interaction with the call handling systems.

However, in other circumstances, monitoring the presence of an employee may not be so obvious. If the call center agent works at home, then visual monitoring may not be feasible. Similarly, for a plumber dispatched to service calls, visual monitoring by a supervisor may not be feasible. In such instances, failure to adhere to a work schedule may only be detected after a lengthy time period and may not be noticed by the employer until well after the fact, and may jeopardize meeting planned goals. Thus, additional approaches for monitoring employee adherence to a schedule are required.

BRIEF SUMMARY

Technologies are generally presented herein pertaining to a scheduling adherence system ("SAS") that monitors an employee's adherence to a work schedule. The SAS comprises a mobile application in a mobile processing device, such as a smart phone or tablet, that communicates with a scheduling adherence server ("SAServer"). The SAServer may maintain location information of the employee. The SAServer receives location information of the employee from the mobile processing device and determines whether the reported location information is compatible with the work location and shift scheduled for that employee. An incompatible work location may result in a non-compliance condition being reported. The mobile processing device may execute an application that provides other shift related information and functions available for use by the employee, such as checking-in at a work location and automatically reporting location information.

The subject matter disclosed herein may be implemented in various forms, including as a computer-controlled apparatus, a computer process, a computing system, or as an article of manufacture such as a computer readable storage medium. These and various other features will be apparent from the following Detailed Description and the associated drawings.

This Summary is provided to exemplify concepts in a high level form that are further described below in the Detailed Description. This Summary is not intended to identify key or essential features of the claimed subject matter, nor is it intended that this Summary be used to limit the scope of the claimed subject matter. Furthermore, the claimed subject matter is not limited to implementations that address any or all disadvantages noted in any part of this disclosure.

BRIEF DESCRIPTION OF THE DRAWINGS

Reference will now be made to the accompanying drawings, which are not necessarily drawn to scale, and wherein.

DETAILED DESCRIPTION

Figure 1:
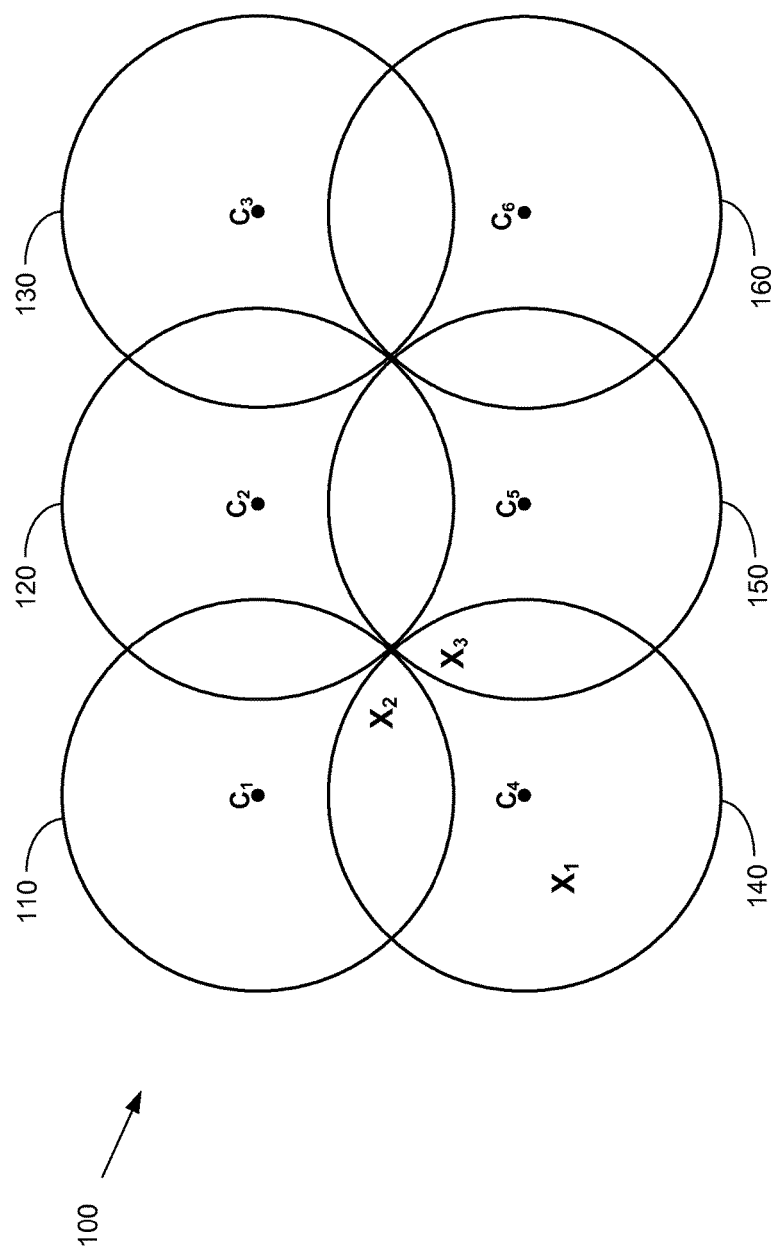
FIG. 1 shows one conceptual illustration of determining the location of an employee.

Various embodiments for practicing the technologies disclosed herein are described more fully hereinafter with reference to the accompanying drawings, in which some, but not all embodiments of the technologies disclosed are shown. Indeed, the embodiments disclosed herein are provided so that this disclosure will satisfy applicable legal requirements and should not be construed as limiting or precluding other embodiments applying the teachings and concepts disclosed herein. Like numbers in the drawings refer to like elements throughout.

Technologies are generally presented herein pertaining to a scheduling adherence system ("SAS") that monitors an employee's adherence to a work schedule. The SAS comprises a mobile application in a mobile processing device, such as a smart phone or tablet, that communications with a scheduling adherence server ("SAServer"). The SAServer may maintain location information of the employee. The SAServer receives location information of the employee from the mobile processing device and determines whether the reported location information is compatible with the work location and shift scheduled for that employee. An incompatible work location may result in a non-compliance report being generated. The mobile processing device may execute an application that provides other shift related information and functions to the employee, such as checking-in at a work location and automatically reporting location information Employer Monitoring of Employees Employers may occasionally have a need to monitor their employees to ensure that the employees are working and adhering to a work schedule. In some cases, employee monitoring can occur visually, such as when the employee performs their work duties in the presence of a supervisor. If the employee works according to a stable or predictable schedule and in the same location, then a supervisor can easily visually monitor the employee by periodically "spot-checking" the worker's performance by visiting the work location or job site.

In other circumstances, the supervisor cannot easily visually monitor the employee, nor can the supervisor easily "spot-check" the employee's performance. A supervisor may not be present to visually monitor the employee, and further, frequent visual monitoring can be distracting to an employee. Further, such in-person monitoring may consume significant time of the supervisor when there is no issue with the employee's performance.

In one embodiment where the supervisor cannot easily visually monitor is when the employee may be a call center agent that works at home—a so-called "virtual" call agent. The virtual call agent may have a varied work schedule, day-to-day. While agent activity and performance can be monitored, to an extent, by monitoring the calls handled by the agent during a shift, as it will be shown, this is not always possible or indicative of whether the agent is adhering to the work schedule. However, whenever the agent is working, it can be expected that the agent will be in the same location (near their workstation). Further, it can be expected that the agent will deviate very little from this location while working. While the agent can take brief breaks, such breaks are reported and classified according to various break codes that indicate the nature of the break.

In another embodiment, the employee could be an individual, such as a construction worker or service-oriented person, having a relatively constant schedule, but working at different locations. For example, a construction worker involved in building a road or bridge may work a regular day shift, but may be only located in a general area for the duration of the project. Similarly, a plumber could work a regular day shift, but may be scheduled to visit different locations in a day. In either of these circumstances, an employer knows when the employee should be working, but may not be able to easily determine if that is the case.

Scheduling employees according to a work schedule is often necessary for the employer to meet its performance objectives and contractual client commitments. For example, the number of agents scheduled for work shifts in a call center is often aligned with forecasted call volumes and client commitments. When agents do not adhere to their work schedule, call center performance can quickly degrade from a targeted level and jeopardize performance goals.

An employee's failure to conform to a schedule can occur in several ways. In one case, the employee may arrive late for their shift. In many situations, the late arrival cannot be fully determined until a point in time has passed at which the employee agent should have been present. In other words, the agent cannot be identified as being late until their shift has begun, or just before the shift has begun. From a planning perspective, if the supervisor knew that the employee would be late (e.g., the agent had informed the call center), the supervisor could have potentially identified a replacement or could have requested other employees to extend their current shift. However, the employee may not provide advance notice of being late. Often times, the earlier the supervisor knows about the anticipated late arrival, the easier it is for the supervisor to adjust for the employee's tardiness.

Monitoring an employee's location is one approach for determining whether the employee is likely to be engaged in work. In many instances, verifying an employee is at an expected work location does not necessary guarantee they are working, and this may only indicated that the location is consistent with the employee working. However, an employee that is located in an unexpected location during their shift is unlikely to be working in an appropriate manner. Specifically, if virtual agent is not in their home or at the same location in their home as when they are scheduled to handle calls, or the plumber is not located at a job site where work is scheduled, then it is suggestive that the employee is not adhering to their work schedule.

In the following disclosure, two embodiments are presented where location information is used in conjunction with an employee's schedule to ascertain whether the employee is likely engaged in their work duties or likely engaged in some other non-work activity. These embodiments may be based on the employee using a smart phone or tablet having location identification capabilities, such as involving global positioning system ("GPS") technology. The employer may provide the processing device and/or the mobile application to the employee that executes in a smart phone or tablet carried about by the employee. For example, the employer can identify a website from where the mobile application can be downloaded to the employee's mobile phone. Once the mobile application is executed, the mobile application ("Mobile App") may report location information and may be used for other functions. For example, the employee can use the mobile application to "check-in" or "log-in" once arriving at the job site time and can the mobile application can track the time the employee is working on the job. When the employee "checks-in" this indicates that the employee is ready to begin work, and is present at the appropriate work location. Similarly, when the employee checks-out, this means the employee has completed the work at the work location. Thus, the SAServer knows the employee has reported for work and is working at the indicated location. This tracking can also be used for determining time for compensating the employee or invoicing the client for services rendered. Although the present disclosure refers to an "employer" and "employee," the concepts are not limited to such a relationship and can be applied to other relationships, such as involving a vendor, contractor, etc.

Location Determination

The location of the employee is assumed to be coincident with the mobile processing device, such as a smart phone or tablet that can determine location based on the above mentioned technologies. An employee can be conceptualized as being in a circular area associated with a location coordinate determined by the device, referred to herein as a "location area." The "work location," "work zone," or "job site" (whichever form it is referred to) refers to an area where the worker is expected to be while performing their work. The size of the work location or job site depends on the context of the work to be performed. The shape of the job site can be described as a single large circular area, or as a grouping of smaller circular areas so as to allow other shapes to be approximated (e.g., rectangles or irregular shapes). This allows the contours of a particular work location to be context dependent.

Determining the location of the employee can be accomplished in one embodiment using GPS technologies. GPS may be augmented with other technologies, including various cellular provided location technologies to provide a more accurate indication or to supplement the accuracy of GPS technology.

The accuracy of GPS technology varies based on various factors. Thus, the accuracy can range from a few meters to 50 meters, depending on the technology involved. This can be illustrated using an exemplary map 100 shown in FIG. 1. FIG. 1 illustrates a hypothetical map 100 involving six center points that are designated as $C_1$-$C_6$. While each center point may involve separate longitude and latitude coordinates and could be referenced by such values, reference to a center point (e.g., "$C_1$") is sufficient for the purposes herein.

The circles 110-160 represent areas where a certain percentages of measurements will be accurate with respect to the corresponding center points $C_1$-$C_6$. For example, each circle may represent a circular error probability ("CEP") where a certain percentage (e.g., 50%) of the measurements is accurately associated within that area. A larger circle can be defined such that 88% or 95% probability is achieved. Typically, the radius of a circle where the CEP is 50% is designated at a distance R, and twice that distance (2R) results in a CEP of 88%, and 2.4R results in a CEP of 95%.

It is evidence from FIG. 1 that if the employee is located in position $X_1$ that they will likely be reported as being at coordinate $C_3$, but most not likely in $C_1$ or $C_4$. It can be expected that it would be even more unlikely for the employee to be reported as being in $C_3$ or $C_6$. However, if the employee is located at $X_2$, they could be reported as being in location $C_1$, but not likely as being in $C_2$ or $C_4$, or the others. On the other hand, if the employee is located at $X_3$ they could be likely reported as being at $C_3$ or $C_4$, but less likely as being in $C_2$ or $C_1$, and they would likely not be reported as being in $C_3$ or $C_6$. Thus, depending on where an employee is located, a stationary employee could be measured as being at a first coordinate or and at another, adjacent coordinate. Such readings would not necessarily indicate the employee was moving.

As noted above, depending on the technology, radius of a CEP with a 50% accuracy may vary. However, for purposes of illustration, it is assumed in one embodiment to be 3 meters. An employee working as a call center agent would be expected to be fairly stationary when performing their duties, as they would typically sit in front of a workstation and handle calls. Their movement, even if using a wireless headset, would likely be within less than 3 meters from their workstation. Thus, if the agent is located at their workstation at the boundary of two adjacent coordinates, it would not be unusual for the agent to be reported as being located at one of two adjacent coordinates at different times. For example, the agent could be within $C_3$, or $C_1$, or even $C_4$.

However, if the agent is subsequently measured as being at $C_3$, then this would suggest that the agent has moved away from their regular work environment. As the distance the employee is measured increases relative to the expected work location, this suggests the agent has moved away from their work environment. For example, if the call center agent is now measured as being 20 meters away from their regular work environment, the discrepancy is difficult to assign as measurement error. Rather, it appears the agent has walked away from their workstation.

In other contexts, an employee initially measured as being in $C_3$ may very well be expected to also be found in adjacent areas $C_1$, $C_2$, $C_4$, $C_5$, or $C_6$. For example, the employee may be a construction worker where the work location is a bridge construction site. The overall work location may span hundreds of meters and may encompass $C_1$-$C_6$. It may be reasonable for the worker to be in any portion of the work environment at a given time, and the worksite could encompass a large number of measurement coordinates.

The point at which the employee's location coordinates exceed an expected threshold, such that the employee is deemed to have left the worksite, depends on each context. Factors include the size of the worksite, the work duties performed by the employee at the worksite, the schedule of the employee, and the accuracy of the location determination equipment used to monitor the employee's location. Each employer can define a distance threshold for each employee's context that is appropriate. For example, a service technician working at a residence can be expected to return to his vehicle, which may be parked near a driveway entrance, in order to retrieve tools. Thus, a threshold distance of 100 meters may not be unusual when the technician is working at a job site. A call center agent working at a workstation, however, would not be expected to deviate more than 3 meters for their location while working, because they are not able to interact with their workstation. In the former case, the work location may encompass a number of measurement areas, whereas in the latter case, the work location would be one or two adjacent measurement areas.

Exemplary Call Center Architecture

Figure 2:
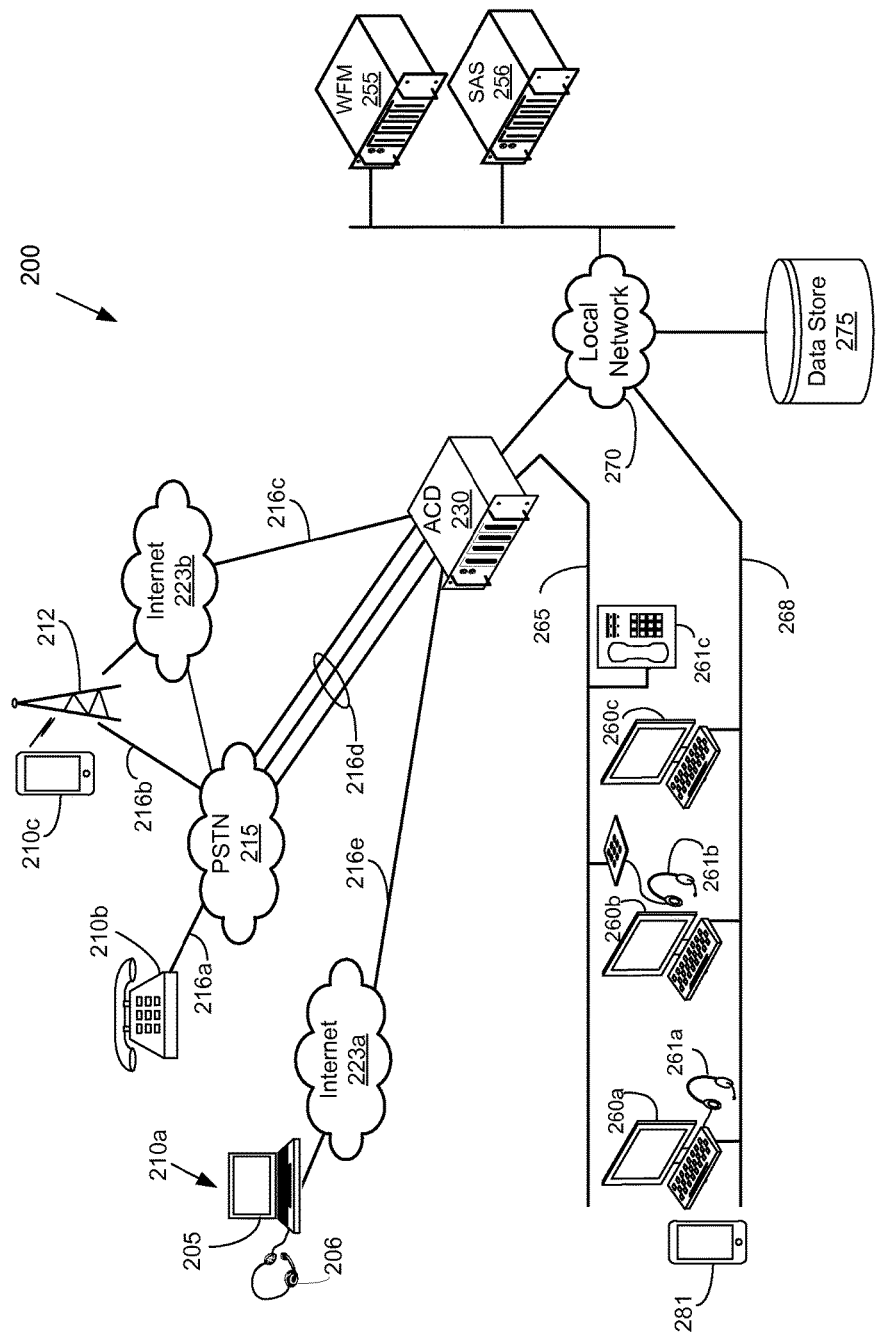
FIG. 2 illustrates one embodiment of a call center architecture employing a scheduling adherence system.

FIG. 2 shows one embodiment of a call center architecture 200 illustrating the various technologies disclosed herein. The call center shown in FIG. 2 may process voice calls that are inbound-only, outbound-only, or a combination of both (sometimes referred to as a "blended" call center). Although many aspects of call center operation is disclosed in the context of voice calls, the call center may process other forms of communication such as facsimiles, emails, text messages, video calls, chat messages, and other forms.

Inbound voice calls may originate from calling parties using a variety of phone types. A calling party may originate a call from a conventional analog telephone 210*b* connected to a public switched telephone network ("PSTN") 215 using an analog plain old telephone service ("POTS") line 216*a*. The calls may be routed by the PSTN 215 and may comprise various types of facilities 216*d*.

Inbound voice calls may also originate from a mobile device 210*c*, such as a smart phone or tablet, which wirelessly communicates with a mobile service provider ("MSP") 212. The voice calls may be routed to the PSTN 215 using an integrated services digital network ("ISDN") interface 216*b* or other types of interfaces that are well known to those skilled in the art. The MSP 212 may also route calls as packetized voice, referred to herein as voice-over-IP ("VoIP") to an Internet provider 223*b* using Internet-based protocols. For convenience, unless indicated otherwise, the term "trunk" refers to any type of facility 216*c*, 216*d*, or 216*e* providing voice calls to, or from, the call center, regardless of the type of protocol or technology used.

Specifically, a "trunk" as referred to herein is not limited to time-division multiplexing ("TDM") technology.

Voice calls may also originate from a calling party employing a so-called "IP phone," "VoIP phone," or "soft phone" 210a. In one embodiment, this device may comprise a computing device 205, such as a laptop, desktop, or computing tablet, which interfaces with a headphone/microphone combination, also referred to as a "headset" 206. An IP phone may use a digital voice control protocol and may process packetized voice data according to various Internet based voice protocols, such as session initiated protocol ("SIP"). The call may be conveyed by other types of Internet providers 223a, such as a cable company providing Internet access services over a coaxial cable facility 216e. Those skilled in the art will recognize that a variety of protocols and facilities may be used to convey voice calls.

Inbound calls from callers to the call center may be received at an automatic call distributor ("ACD") 230. The ACD 230 may be a specialized switch for receiving and routing inbound calls under various conditions. The ACD 230 may route an incoming call over call center facilities 265 to an available agent. The facilities 265 may be any suitable technology for conveying the call, including, but not limited to, a local area network ("LAN"), wide area network ("WAN"), ISDN, or conventional TDM circuits. The facilities 265 may be the same or different from the facilities used to transport the call to the ACD 230. The ACD may also communication using data communication facilities 268, using a local network 270 for communicating data with each computer 260a-260c.

Calls may be routed over facilities 265 to an agent for servicing. That is, the party may speak with an agent for receiving, for example, customer service. The physical area at which the agent sits is often referred to as an agent "position" and these positions are often grouped into clusters in a call center that are managed by a supervisor, who may monitor calls and the agents' productivity. An agent usually uses a computing device, such as a computer 260a-260c and a voice device 261a-261c. The combination of computer and voice device may be referred to as a "workstation." Thus, the workstation collectively has a data capability and a voice capability, though separate devices may be used. In some instances, "workstation" may be used in reference to either the data or voice capability at the agent's position, as appropriate to the context. For example, "routing the call to the agent's workstation" means routing a call to one of the voice devices 261a-261c at the agent's position. Similarly, "routing the call to the agent" means routing a call to the appropriate equipment at an agent's position.

The voice device used by an agent may be a soft phone device exemplified by a headset 261a connected to the computer 260a. The soft phone may be virtual telephone implemented in part by an application program executing in a computer. The phone may also comprise an Internet Protocol ("IP") based headset 261b or a conventional phone 261c. Use of the term "phone" is intended to encompass all these types of voice devices used by an agent, unless indicated otherwise.

The agent may also use a smart phone 281 for certain call center related functions. The smart phone may execute a mobile application (not shown) that facilitates management of the agent's schedule. Specifically, the smart phone mobile application may be used to communicate upcoming work schedules from the call center to the agent, as well as request modifications to their schedule. Further, for work-at-home agents, the mobile application may allow the agent to log-in to a scheduling system and update their schedule. The mobile application may utilize GPS capabilities frequently incorporated into smart phones and report the agent's location. More about this will be discussed later.

An agent typically logs onto their workstation prior to handling calls. This allows the call center to know which agents are available for handling calls. The ACD 230 may also maintain data of an agent's skill level that is used to route a specific call to the agent, or group of agents having the same skill level.

Another component that may be employed in a call center is a workforce management ("WFM") 255. This component maintains information to generate agent's schedules to effectively handle inbound/outbound calls. The WFM 255 may maintain historical call volume information for call campaigns and forecast expected call volume to predict the number of agents needed to handle the call volume at a defined service level. The WFM 255 can then apply information about available agents to then generate a work roster of agents. In other words, the WFM 255 schedules agents for their work shifts according to the anticipated needs of the call campaigns.

Finally, in various embodiments, the call center architecture 200 may include a schedule adherence system ("SAS") 256 to monitor the agent's adherence to a defined work schedule. In some embodiments, the SAS 256 could be a distinct system that cooperates with the WFM 255, or the SAS could comprise a module incorporated in the WFM 255.

Various data may be stored in the data store 275, including for example, schedule data created b the WFM 255 and/or location data used by the SAS 256. The data store 275 may be stored in various ways across a plurality of storage systems, including in a distributed manner that may be incorporated with the WFM 255 and/or SAS 256.

Various embodiments are possible and FIG. 2 only illustrates one embodiment. Further details on the SAS 256 will be discussed below.

Although the above components may be variously referred to as "servers," each may be also referred to as a "processing device," "unit," "component" or "system" and may incorporate a local data store or database, or interface with an external database. Use of the word "server" herein does not require the component to interact in a client-server arrangement using web-based protocols with other components, although that may be the case. Further, the above components may be located remotely from (or co-located with) other components. Furthermore, one or more of the components may be implemented on a single processing device to perform the functions described herein. For example, in various embodiments, one or more functionalities of the WFM 255 and SAS 256 may be combined into single hardware platform executing one of more software modules. In addition, the call center architecture 200 may be provided as a hosted solution, where the call processing functionality is provided as a communication service (a so-called "communication as a service" or "CaaS") to a call center operator. Thus, there is no requirement that the servers identified above actually be located or controlled by a call center operator.

In addition, the agent positions can be co-located in a single physical call center or in multiple physical call centers. The agents can be remotely located from the other components of the call center, and may also be remotely located from each other, sometimes referred to as a "virtual call center." A virtual call center may describe a scenario where agents work at home, using their own computers and telephones as workstations. In some configurations, a single physical location of the call center may not be readily identifiable. This may occur when the call processing functions are provided as a service in a hosted cloud computing environment and the agents positions are in their individual residences.

Those skilled in art will recognize FIG. 2 represents one possible configuration of a call center architecture 200, and that variations are possible with respect to the protocols, configuration, facilities, technologies, and equipment used. Other equipment may typically be used, but are not shown as such equipment is not necessary to illustrate the concepts and technologies disclosed herein.

Agent Schedule Adherence

Call center agents are typically assigned to a work schedule indicating the times of their work shift. The schedule may indicate various shifts over a week, which are the times when the agent is expected to be engaged in call center related work activities. It is not uncommon for agents to have staggered starting/ending times relative to other agents, or to have different starting/ending times for shifts on different days of the week. A work shift may encompass breaks, which are times when the agent is not engaged in call center work-related activities. For example, a lunch break or mid-afternoon break allows the agent engage in non-work activities for a limited time. A shift may encompass other work-related activities, such as training sessions, which for purposes herein are categorized as a call center work-related activity, although some refer to this as a "training break."

Call center agents typically perform their work at the same location. In one embodiment, the agent reports to the call center and works at a cubicle in the call center. In another embodiment, the agent is a virtual agent working at the agent's home. When working in the call center, it may be easy for a supervisor to visually monitor the presence of an agent, but when the agent is working at home, this may not be possible. The interactions of the agent with the call handling system frequently are used to monitor the agent's performance, as opposed to visual monitoring. For purposes herein, any of the components involved in call handling, including those shown in FIG. 2, are referred to generically as the call handling system ("CHS").

Thus, a call center agent may be characterized as working in the same location during a shift, but the start/stop times of the shift may vary according to their work schedule. In other applications, the concepts and technologies herein can be applied to employees that work common times for a work shift, but their work location may change. For example, the above mentioned service technician may work approximately the same start/stop times each day, but at different work locations. The concepts and technologies herein can be just as easily applied to other types of employees having varying times and work locations.

An agent's work time during a shift can be classified as being engaged in one of four categories. As a prerequisite, for each of the categories, the agent is presumed to have logged-in to the call handling system and have started their shift. After logging-in, the agent is available to accept a call. During this time, the agent can be classified as in a "waiting" mode. A call may be connected to the agent and once the agent is engaged with a caller, the caller can be classified as being in a "connect" mode. After the caller completes the call, the caller may have to perform various tasks to resolve the caller's issue, provide notes on the call, forward information to another department, etc. The agent is engaged in after call work ("ACW") that begins with the end of the call and ends with the agent providing a disposition of the call. This returns the agent back into the waiting mode for the next call. The agent may also be in a "pause" mode which suspends the call handling system from offering a call to the agent. The agent may be on a break, such as a lunch break, shift break, bathroom break, training break, etc. Typically, the reason the pause mode was entered is indicated by the agent using a "pause code," so that the different types of breaks can be noted. Typically, if the agent requests to enter the pause mode while on a call, the call is allowed to complete before the CHS placed the agent into the pause mode.

Each of these time periods is monitored by the CHS, and reports may be generated indicating the amount of time, and the respective percentage of time, that the agent is spending in each category. The CHS cannot readily ascertain during the ACW if the agent is fully engaged in the appropriate activity, but only when the period begins and ends. Determining that the agent is fully engaged in the appropriate activity can be especially difficult if the agent is a work-at-home agent, since the agent may not be easily visually monitored by the call center administrator. It is possible, e.g., that the agent could spend several minutes in ACW and then several minutes performing personal tasks before dispositioning the call. For example, the agent could engage in non-work related activities instead of dispositioning the call and entering the pause mode. While procedures may instruct the agent to enter the pause mode when performing non-call center activities, the agent instead may nevertheless continue in the ACW mode.

If agents perform non-work activities during the ACW, an excessive ACW duration may show up in a call center management report for that agent. However, an agent may explain away the anomaly to a supervisor based on various reasons. In other cases, the call center supervisor may not even be aware of the appropriate report, or may not examine this particular metric to properly determine whether the agent is properly adhering to the shift schedule or work procedures.

One approach of providing an indication of non-compliance by the agent involves monitoring the agent's work location during their shift. This can be done using a mobile application executed in the agent's smart phone using GPS technology to determine the agent's location. The employer may provide the smart phone with the mobile application, or may provide the mobile application for use on the agent's smart phone. The mobile application can indicate the current location of the agent which can be compared with a location associated with the agent's work location. A deviation in location may indicate that the agent is not engaged in work-related activities.

Determining whether the agent is in an appropriate work location depends on various factors and contexts. For example, for a call center agent working in a call center, their work location may be fairly stationary, as it largely involves sitting at a cubicle. A call center agent working at home may utilize a wireless headset, and could possible roam about a room or a house and still engage in work activities. On the other hand, applications of the concepts and technologies disclosed herein could apply to other forms of workers that have a larger expected work area. For example, a construction worker working on a bridge construction project may have a much larger work area compare to a call center agent. Similarly, a railroad engineer may work in a railroad switching yard and have still yet a much larger work area.

Mobile Application

The mobile phone 281 used by the agent may incorporate a mobile application used to ascertain and report the location of the agent. The mobile application may be aware of the employee's schedule, either directly or indirectly. The mobile application could use any of the conventional location determining technologies, including GPS that may be augmented by other technologies, to report the employee's work location, either on a "push" basis or a "pull" basis. "Push" reporting of location would involve the mobile application periodically reporting the smart phone's location, whereas "pull" location reporting would involve a request send to the mobile application to report its location.

The mobile application may be further configured to only report work location within the time period when the employee is working during a shift. Further, location reporting may be suspended during the employee work breaks. Thus, when the employee is working and is "on-the-clock", the employee's location may be monitored, but when the employee is "off-the-clock" (e.g., on break, before their shift, or after the shift), then the employee's location may not be monitored. This process is illustrated in FIG. 3.

Figure 3:
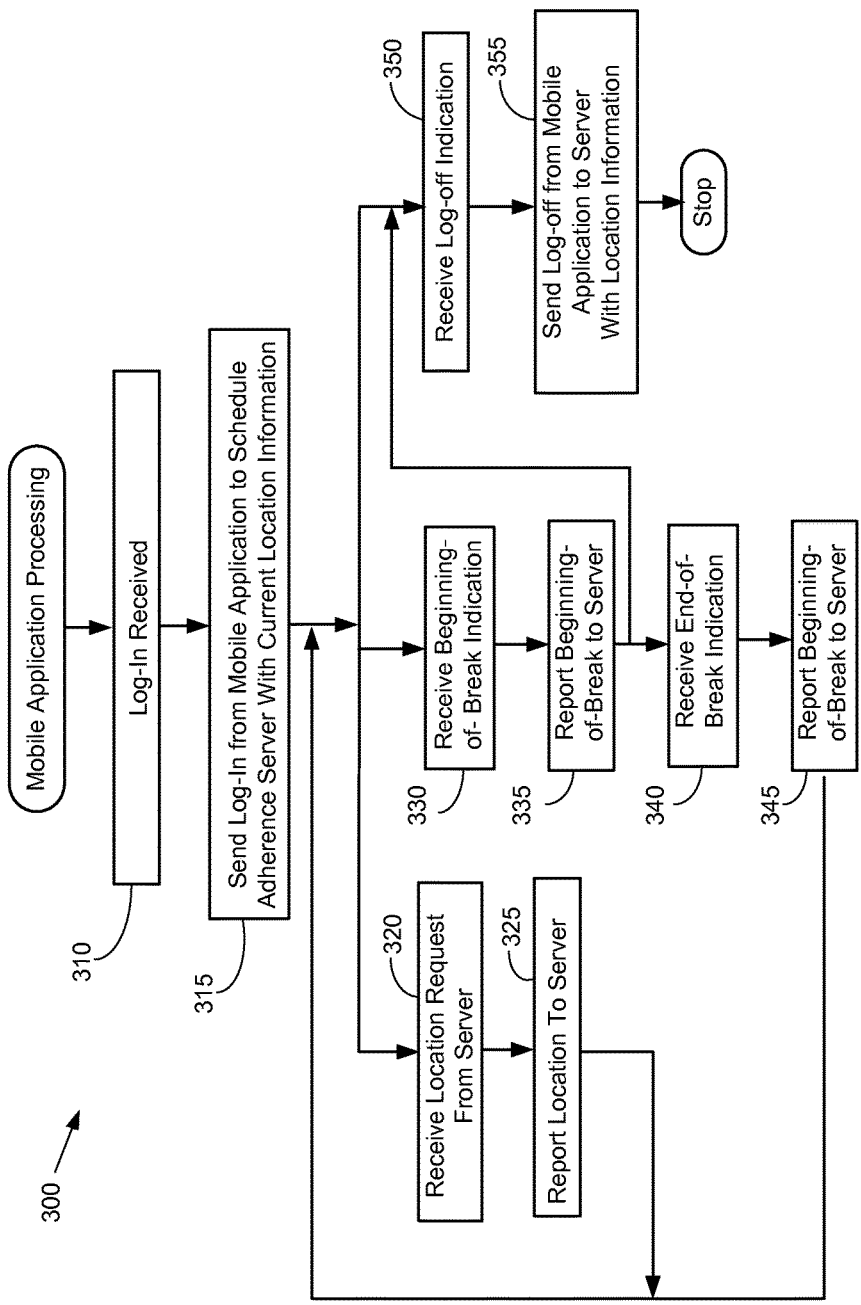
FIG. 3 illustrates one process flow associated with a mobile application indicating employee location information as part of a scheduling adherence system.

Turning to FIG. 3, the process 300 illustrates the mobile application processing beginning with the employee logging-in for a work shift in operation 310. The employee may be motivated to log-in because this initiates a timer for tracking the employee's working time, and may impact their compensation. The mobile application in operation 315 may report the log-in and location information to the SAServer, when then records the data. The messaging reporting the log-in at operation 315 may also provide a smart phone identifier, which can be correlated to the employee, or an employee identifier. In other embodiments, the employee may log-in to another system, which then reports the log-in status to the mobile application. Thus, for example, a call center agent may log-in to the CHS at their workstation, which then notifies the mobile application of the agent's status, so that it is enable to report the agent's location. In other embodiments, the agent may only log-in via the mobile application, or separately via both systems.

At this point, the mobile application may wait to perform one of three separate processes depending on the input. In operation 320, the mobile application may wirelessly receive a request for its location, which it responds to the SAServer in operation 325. In other embodiments, the mobile application could periodically report its location, or report whenever its location deviates from a set amount from a work coordinate. After completing this operation, the process loops back and awaits the next input.

The other process that could be initiated is shown in operation 330 where the mobile application receives a beginning-of-break indication from the employee. This may be reported to the SAServer in operation 335. At this point, the mobile application would not respond to a location request if received from the SAServer. The employee is "on their own time" so to speak, and their location whereabouts would not be recorded or reported. The mobile application is configured in one embodiment to only report location information while the employee is working on their shift, and not prior to the shift, nor while the employee has indicated they are on break. This provides a balance between the employee's privacy and the employer's ability to monitor the employee during a work shift.

After operation 335, the mobile application would receive either an indication to exit the break, or log-off from the shift entirely. If the employee completes their break, the mobile application receives this indication in operation 340 and reports this in operation 345 to the SAServer. At this point, the mobile application may report its location in operation 320, if requested.

Alternatively, the mobile application would receive an employee log-off indication in operation 350. Upon receiving the log-off indication, the mobile application would report its location and that the employee is logging-off in operation 355 to the SAServer. The mobile application may also send other information, such as the total duration of the times worked that shift, or the times defining duration. This information could be further used by the SAServer, or forwarded to other systems, to notify billing or payroll systems of the employee's work times. The SAServer then knows that further location reports from the mobile device will not be forthcoming. The process then completes.

Figure 4:
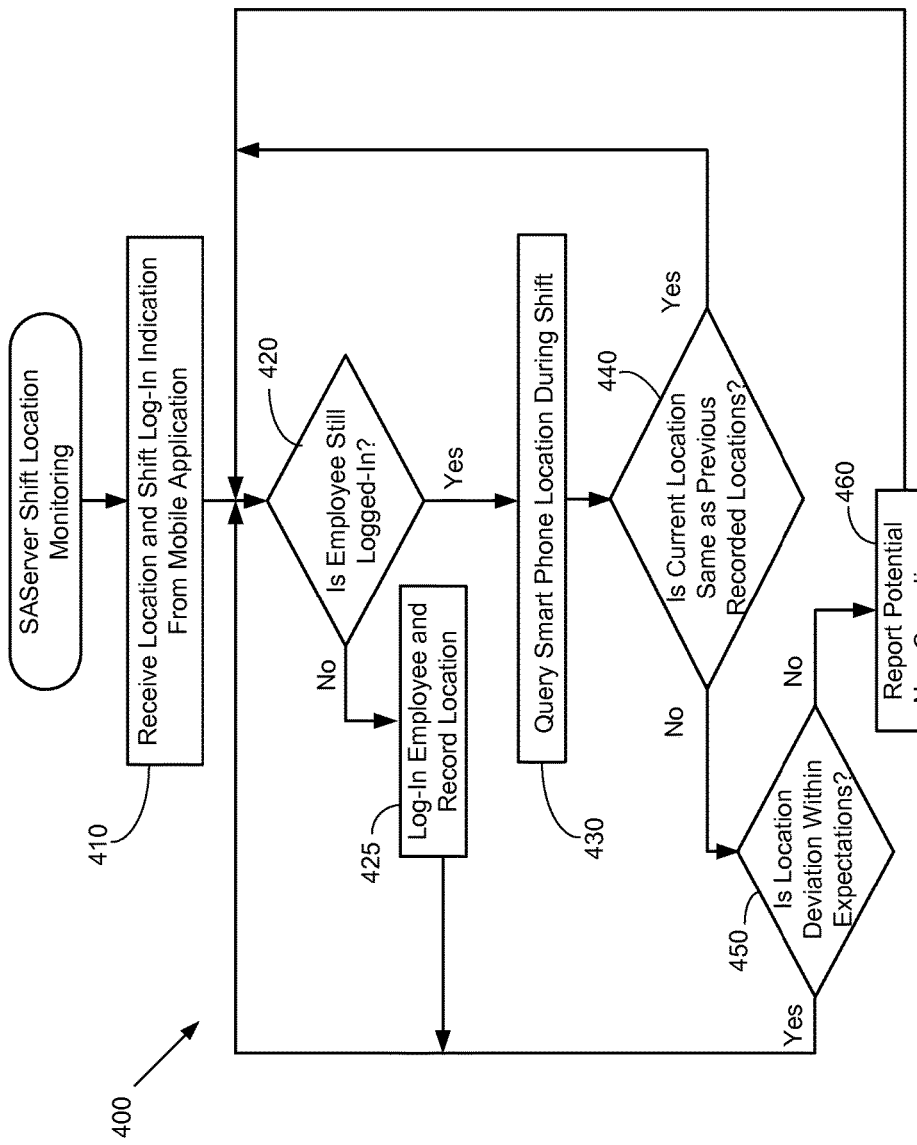
FIG. 4 illustrates one process flow for monitoring employee location in a scheduling adherence system.

A corresponding process for the SAServer interacting with the mobile application is shown in FIG. 4. The process 400 involves the SAServer receiving in operation 410 a shift log-in message along with location information. The SAServer now knows the user has begun their assigned shift, which should coincide with the time that the shift was previously scheduled for that employee. The SAServer may note if the employee is starting their shift and deviates from the expected log-in time.

In operation 420 a test is made to determine whether the employee is still logged-in. This operation is used to detect if the user has logged-out, and typically on the first pass of the process, the user will be logged-in in operation 425. At operation 430, a query is launched to the smart phone to determine its location. This query may be periodically launched after a certain time period after operation 410, e.g., every 10 minutes.

If the location reported is the same as previously recorded locations of the employee in operation 440, then the process may loop back to operation 420. If the location is not the same, then a separate test in operation 450 may determine whether the deviation is within an expected value for the employee. As noted before, a given deviation may depend on the context. A deviation of a few meters from the expected work location of a call center agent in a call center may represent a deviation outside an allowed threshold, whereas this same deviation for a construction worker may be normal. If the deviation is normal, then the process loops back to operation 420. If the deviation exceeds a threshold, then in operation 460 a potential non-compliance condition may be recorded. The recordation may include the time, employee identifier, and location coordinate, and distance deviation from the normal location.

The process shown in FIG. 4 can be adapted in certain embodiments for specific applications. For example, turning to FIG. 5, the process 500 is adapted specifically for a call center agent and comprises the same steps 410-450 as shown in FIG. 4. Existing mechanisms in a call center system can be used to monitor whether the agent is handling a call or not, but these existing mechanisms may not be effective for determining whether the agent is effectively handling ACW.

In this adaptation of the prior process, a counter is incremented in operation 550 each time a location deviation occurs for an agent. At operation 560 a determination is made whether the counter exceeds a threshold. If not, then the process loops back to operation 420. If the threshold is exceeded, then a test is determined to see if the agent's current ACW time exceeds an average. If not, the process loops back to operation 420. However, if the ACW does exceed an average value (either for that agent or a set of agents), then this suggests that the agent is engaged in inappropriate after call work activity, and delaying indicating the disposition of the call. A potential non-compliant condition is noted in operation 580, and the process loops back to operation 420.

Figure 5:
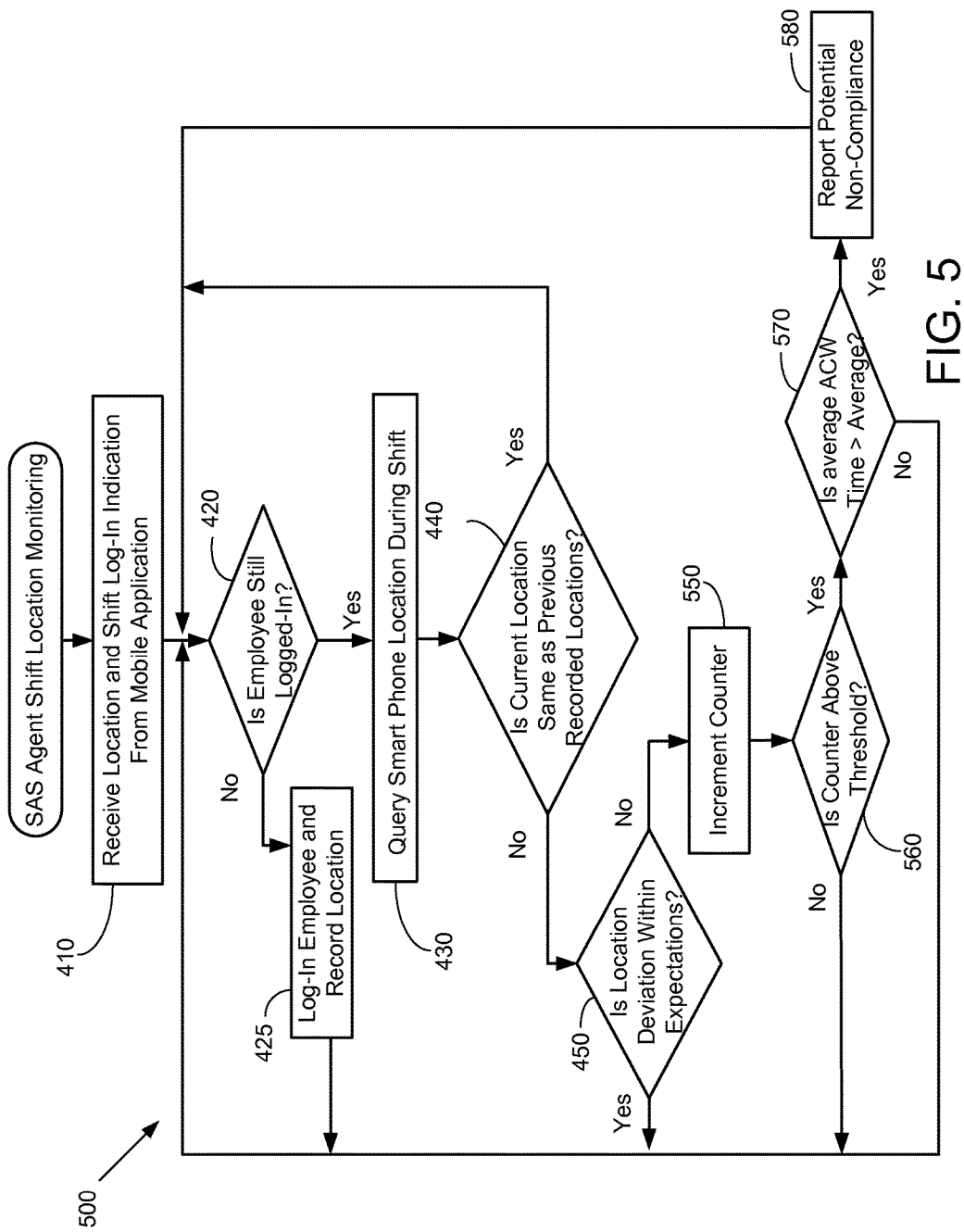
FIG. 5 illustrates one process flow for monitoring agent location in a scheduling adherence system.

The process in FIG. 5 accommodates conditions where the agent may temporarily deviate from an expected work location a certain number of times before a non-compliance report may be generated. If the deviation occurs frequently, then this may indicate inappropriate employee behavior. This mechanism also accommodates the inherent inaccuracy of location determination. As discussed earlier, a given employee location could be reported as being at an adjacent coordinate location point. Consequently, an employee that may be reported as being at one of several adjacent locations because of measurement inaccuracies. The implementation of a counter can be adjusted to accommodate for such conditions. The threshold distance for determining a deviation could also be adjusted.

Figure 6:
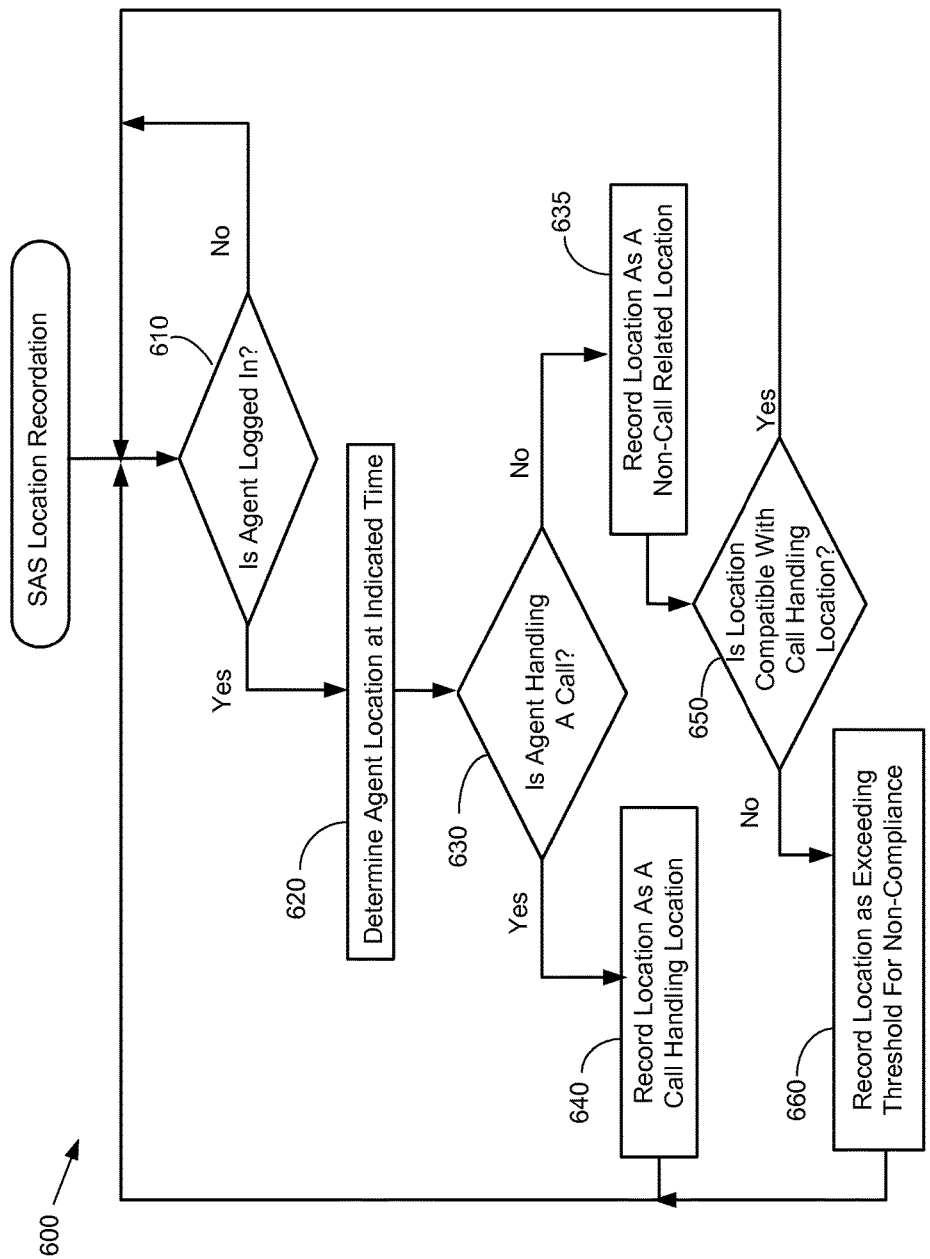
FIG. 6 illustrates one process flow for location recordation in a scheduling adherence system.

The above embodiment compares an agent's work location with previously recorded work location information associated with that agent. One approach for establishing this baseline location reference is shown in FIG. 6, which illustrates the process 600 for the SAServer recording the user's location. The process 600 presumes that previously obtained location information when the agent is handling a call reflects the agent's work location.

Starting at operation 610, the agent's location is queried at an indicated time. If the agent is not logged-in in operation 620 or is on a break, then the location information (if any is returned) may not reflect the agent's location when handling a call. If so, the process loops back to operation 610. If the agent is logged-in at operation 620 then a determination is made at operation 630 whether the agent is handling a call. The agent can be determined as handling a call by querying the call handling system or analyzing records of when the agent was handling a call. If "yes" is received, e.g., the agent is handling a call, then the location is noted as a call handling location in operation 640. This location is then expected to be the same location, within measurement error, of the agent when they are handling a subsequent call.

If the agent is not handling a call, then in one embodiment, the process can loop back to operation 610. In another embodiment, the location can be recorded as a non-call related location in operation 635 and another test can be determined in operation 650 whether the agent is engaged in after-call work. If the location is incompatible with the call handling location, then in operation 660 the location is recorded as exceeding the threshold for non-compliance. Otherwise, the process loops back above to operation 610. In other embodiments, this could be simply recorded as a call handling location, since it can be presumed that the agent is in the same location.

The process 600 shown in FIG. 6 can also occur in a non-real time manner by processing received agent location information in a batch manner against the agent's call handling times during a shift. While the agent is working on a shift and is either waiting for calls, connected to a call, or performing after call work, the agent's location should be similar. A deviation from the location when connected to a call should not be very much at other times.

In another application of the concepts and technologies disclosed herein, the location monitoring can be used to determine whether an agent will be tardy in arriving at the call center and beginning their shift. This process may be applicable when the agent reports to a call center for working, and thus commutes to their work location. Delays may be possible due to traffic, and it can be difficult to determine if the agent is delayed because of this or otherwise will not timely arrive for their shift. This process is based on being able to monitor the location of the agent just before the beginning of the shift. This process is illustrated in FIG. 7.

Figure 7:
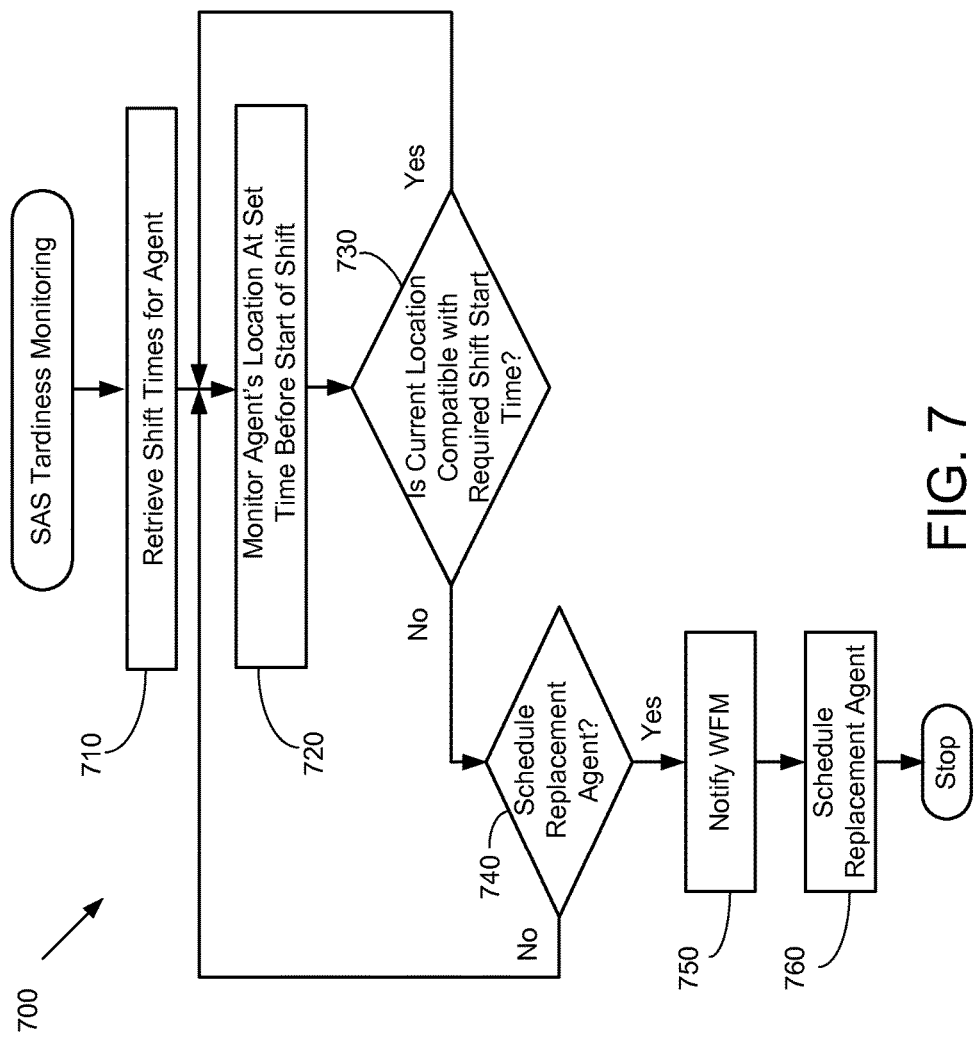
FIG. 7 illustrates one process flow for detecting employee tardiness in a scheduling adherence system.

In FIG. 7, the process 700 involves first retrieving the shift times for an agent. Specifically, in operation 710 the beginning of the shift for an agent is retrieved. This is retrieved prior to the beginning of the agent's shift by a set amount of time, e.g., 15 minutes or some other value that is configurable. In operation 720, the agent's location is monitored. This may involve receiving reports or querying the smart phone of the agent within the 15 minute time period. The locations received are correlated over time and may be averaged to provide an expected time/coordinate location. Thus, a series of data points may indicate a typical location for the agent for each minute interval before they start their shift. These locations provide an indication of where the agent is located relative to their commute at the beginning of a shift. Thus, based on prior commute patterns, the arrival time of the employee can be predicted as being late.

In operation 730, a determination is made whether the current location of the agent is compatible with the agent's relative shift start time. The determination of what is "compatible" will depend on the prior history of the agent's traveling location prior to the beginning of a shirt. For example, an agent may have a 10 minute commute over 3 miles from their home to the call center. A typical history of location measurements shows that if the agent begins their commute 10 minutes before their shift, they will arrive at the call center in sufficient time to make their start of shift. However, if by 5 minutes prior to the start of shift they have not left for the call center, then the agent will likely arrive late. If the commute time is e.g., 45 minutes, then adjustments may be needed to monitor the location of the employee at different times prior to the start of their shift. If the employee's location is compatible with the shift start time, then the process loops back to operation 720 as the agent can be expected to arrive in time to begin their shift.

If the agent's location is not compatible with starting their shift in time in operation 730, then a determination is made in operation 740 whether a replacement agent should be scheduled. If so, then the WFM is notified in operation 750. The WFM may attempt to schedule other agents to fill in for the anticipated tardy agent in operation 760, including: identifying another agent to work beyond the time of their shift, notifying another virtual agent to fill in on a temporary basis until the agent arrives, or notifying another agent to extend their shift at the call center. In this manner, the call center can be informed that the monitored agent is expected to arrive late and can schedule resources accordingly.

The WFM 255 can receive non-compliant report indications and can schedule agents having compatible skills or other requirements. The WFM 255 can then automatically notify other agents, either via the CHS or by communicating via the mobile application.

The concepts and technologies disclosed herein can be applied to other applications. For example, a service worker scheduled to work at a certain location can be monitored to determine when they are located at that location. If the monitored location exceeds an allowable deviation from the work location, then a non-compliance condition can be reported or recorded. The allowable deviation from the work location can be based on the largest distance deviation on the average in a prior history, or can be explicitly indicated by a supervisor. If the location is, e.g., a residential location, then a deviation of 100 yards can be expected, by a deviation of several hundred yards suggests the employee is not at the work location as scheduled.

Embodiment 2

This embodiment involves an employee that may have regular work hours, but whose work location varies according to a schedule. In this embodiment, the employee could be a plumber or other service technician that is dispatched to various locations each day or different locations in a week to perform their work duties. The employee may use the Mobile App to determine where their next work location is, and to indicate when he arrives at that location. Once the task is completed, the employee can check-out. If the application involves rendering an invoice to a client based on the employee's time, then the employee can check-in and check-out (similar to log-in and log-out) using the Mobile App that can be used to determine the time involved. This time can be used for invoicing as well as determining the employee's compensation.

Figure 8:
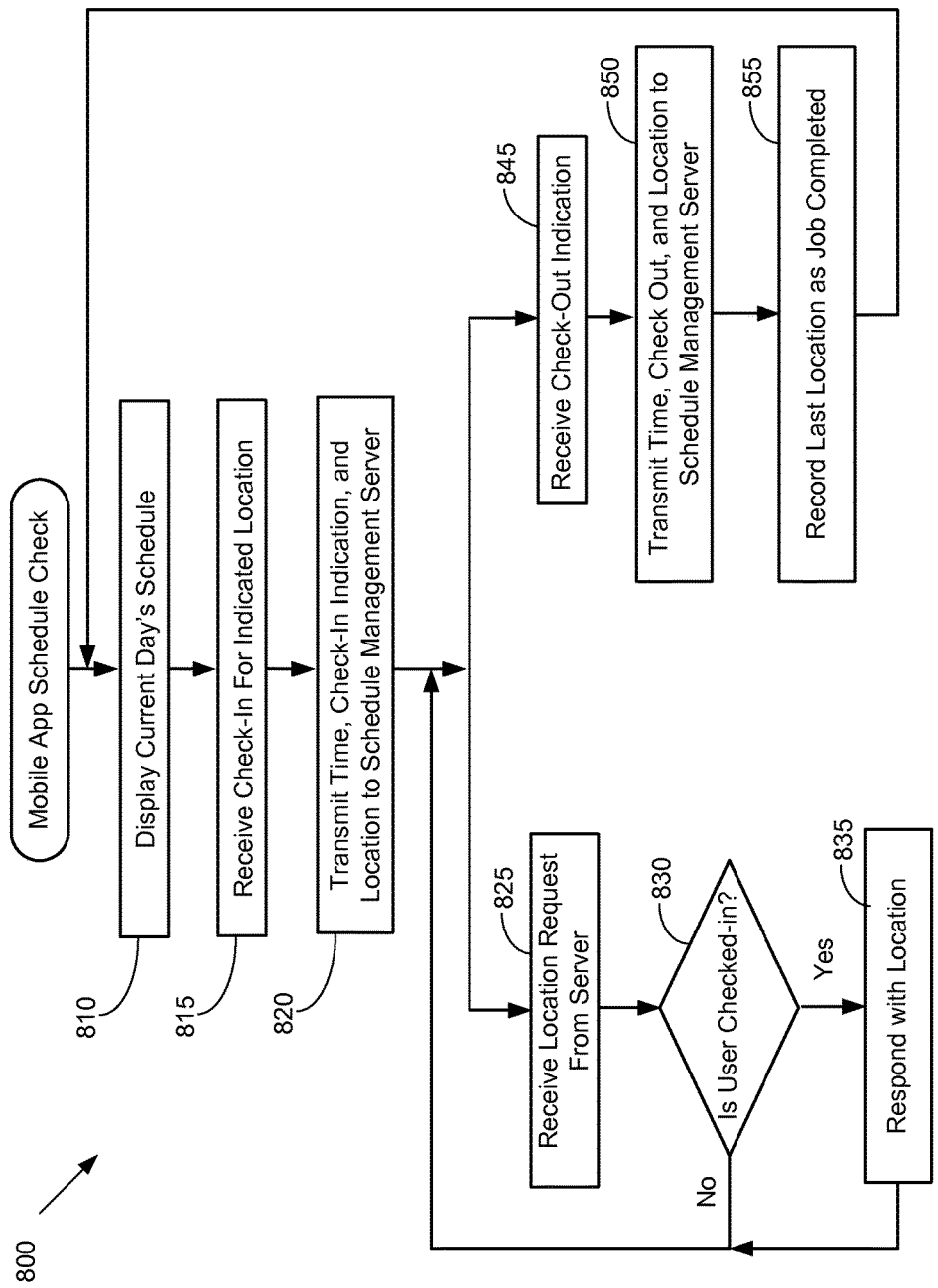
FIG. 8 illustrates one process flow for an employee interaction with a mobile application functioning in a scheduling adherence system.
Figure 9:
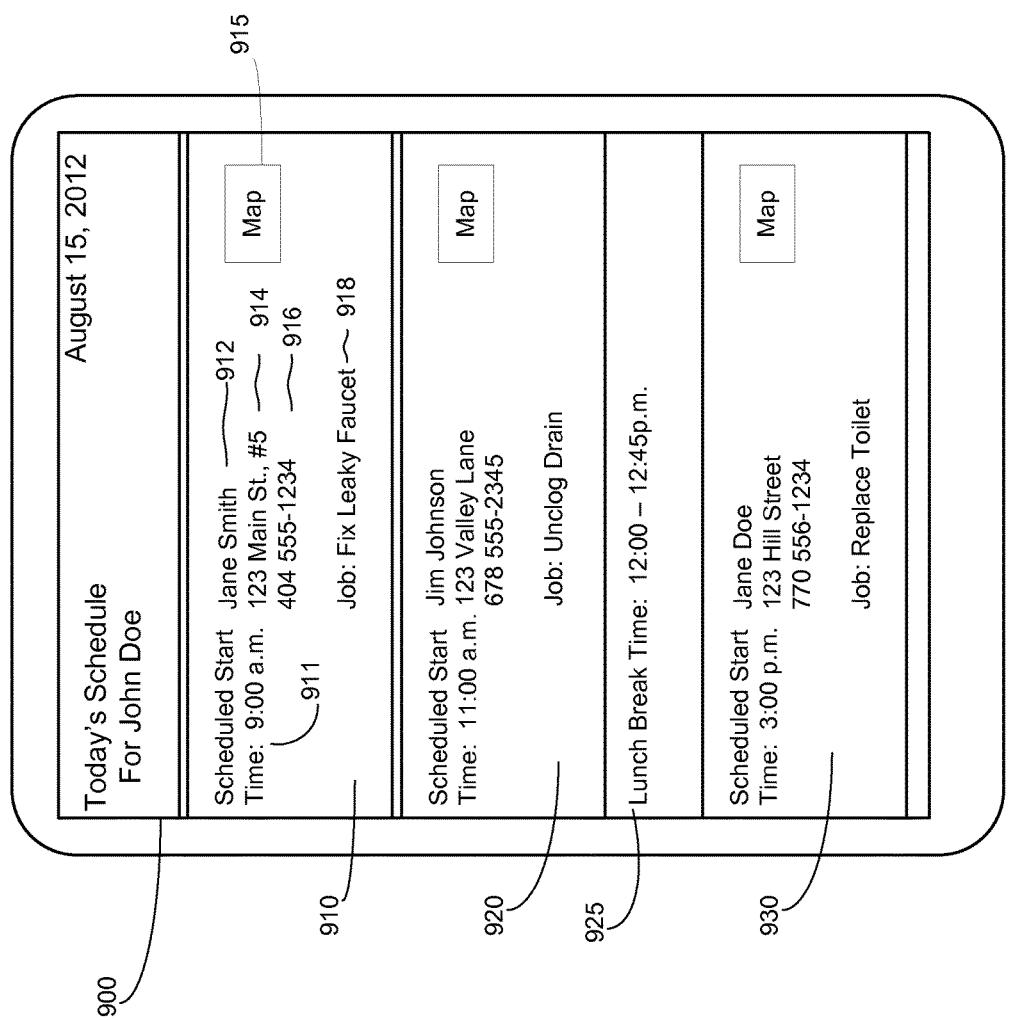
FIG. 9 illustrates one graphical user interface for a mobile application functioning with a scheduling adherence system.

This process is exemplified in FIG. 8 illustrating a process flow 800 that may occur in the Mobile App. The process begins in operation 810 with the employee requesting to display the current schedule. This can be provided whenever the application is opened, or the user selects to view the schedule for the current time. The employee may then travel to the appropriate location based on the indication of the schedule. One embodiment of the graphical user interface of the schedule displayed to the employee is shown in FIG. 9, which will be discussed below.

Returning to FIG. 8, once the employee is at the appropriate work location, the employee can "check-in" using the Mobile App. This is reflected in operation 815 where a check-in or log-in indication is received by the mobile application. A check-in indicates that the employee is ready to begin working. The Mobile App then transmits the current location and time to a defined address to the SAServer in operation 820. The Mobile App will typically include an identifier associated with the employee, so that the SAServer can track where the employee is located.

At this point in this embodiment, the Mobile App can process one of two potential inputs. In operation 825 the Mobile App may receive a location request query from the SAServer. If the user has checked-out, then in operation 830 the Mobile App may be configured to not respond to the request (or respond indicating that the location cannot be provided because the employee is on a break). This may provide a level of privacy for the employee. In other embodiments, the Mobile App may skip the test in operation 830 and always respond with a location in operation 835. These operations allow the SAServer to monitor the location of the employee while checked-in at that job location.

The Mobile App may also receive in operation 845 a check-out indication from the employee. This reflects that the employee has completed their job at the location. The Mobile App then transmits the time, a check-out indication, and location to the SAServer in operation 850. The SAServer now knows that the employee has finished at this location. The Mobile App then records in operation 855 that the current job has completed, and the process then loops back to operation 810. The employee can then check the next location that they are to travel to.

The Mobile App allows the SAServer to be informed when and where the employee is located relative to their work schedule. The location information while at the location can be expected to be within a certain deviation threshold. For example, a plumber working on a residential location would likely have his work location centered within a radius of 250'. In other embodiments, the employee may be expected to be located with a greater or less range, depending on the embodiment. For example, a construction worker involved with building a bridge may have a larger expected location radius than would the plumber.

An embodiment of the user interface provided to the employee as described in operation 810 is shown in FIG. 9. Turning to FIG. 9, the display 900 may reflect the current date and the employee's name. This embodiment displays three panels, 910, 920, and 930 in the display area. The first panel 910 shows an appointment with a scheduled start time 911 of 9:00 a.m. A name 912, address 914, and phone number 916 of work location contact is displayed. Another indication may be provided of the nature of the work 918. Other text-based indications of the location can be indicated. Finally, a map icon 915 may allow the employee to easily request driving directions or other graphical map-related information. Another panel 925 may be displayed that provides an indication of a scheduled break, such as a lunch break.

This arrangement allows the employee to quickly ascertain a schedule, comprising tasks, locations, and breaks defined for a shift. One skilled in the art can devise other user interface configurations to allow the user to check-in and check-out for a given work location.

Exemplary Computer Processing Device

Figure 10:
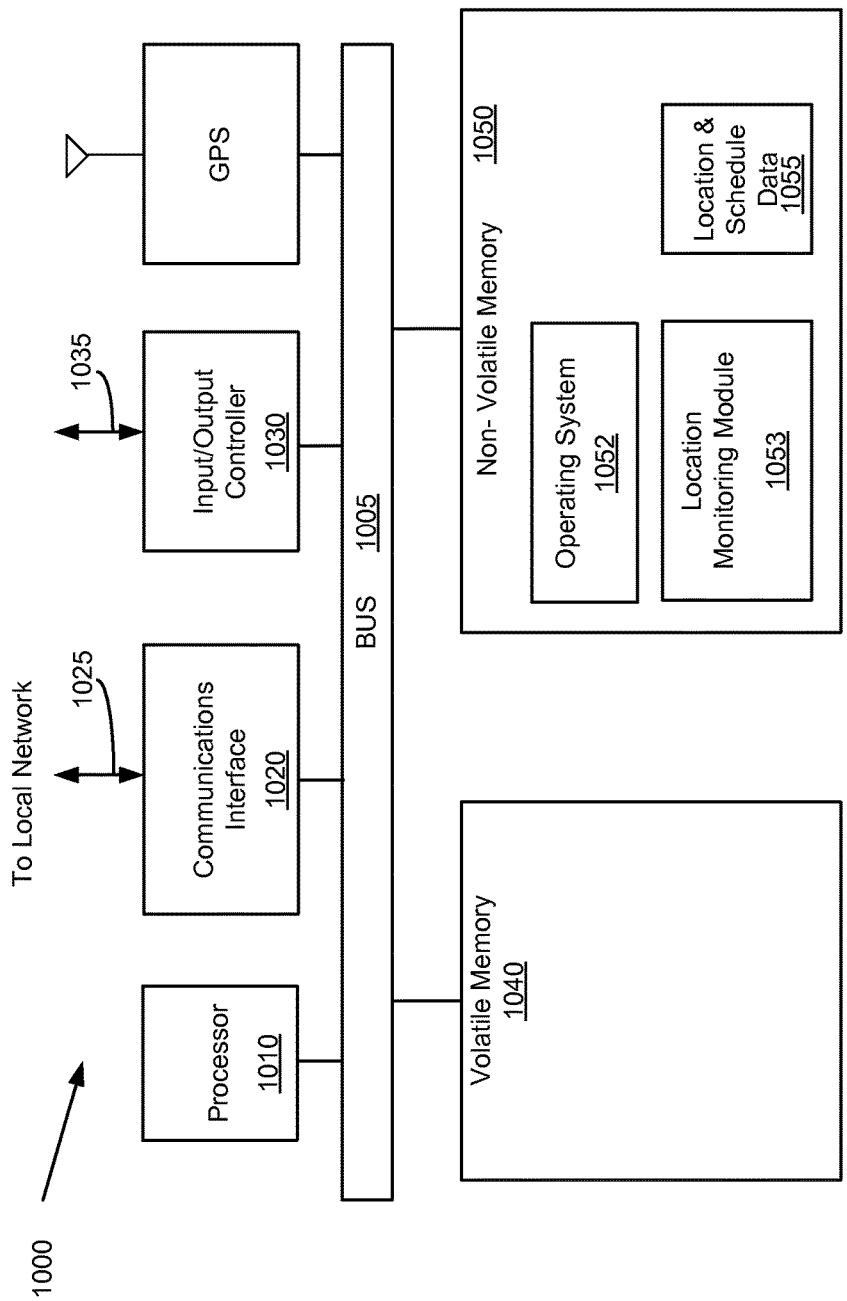
FIG. 10 is an exemplary schematic diagram of a processing device used in a schedule adherence system to practice the technologies disclosed herein.

As discussed in conjunction with FIG. 2, the call center architecture 200 may comprise various components, such as a schedule adherence system that comprises a computer processing system. FIG. 10 is an exemplary schematic diagram of a computer processing system that may be used in an embodiment of the call center architecture to practice the technologies disclosed herein. FIG. 10 provides an exemplary illustration of a computer processing system that can be the basis for the SAServer 256 or the mobile processing system 281 as previously described. In general, the term "computer processing system" may be exemplified by, for example, but without limitation: a personal computer, server, desktop computer, tablets, smart phones, notebooks, laptops, distributed systems, servers, blades, gateways, switches, and the like, as well as any combination of devices or entities adapted to perform the functions described herein.

As shown in FIG. 10, the processing system 1000 may include one or more processors 1010 that may communicate with other elements within the processing system 1000 via a bus 1005. The processor 1010 may be implemented as one or more complex programmable logic devices ("CPLD"), microprocessors, multi-core processors, digital signal processors ("DSP"), system-on-a-chip ("SOC"), co-processing entities, application-specific integrated circuits ("ASIC"), field programmable gate arrays ("FPGA"), programmable logic arrays ("PLA"), hardware accelerators, other circuitry, or the like.

In one embodiment, the processing system 1000 may also include one or more communications interfaces 1020 for communicating data via the local network 270 with various external devices, including those shown in FIG. 2. In various embodiments, communication may be via wired, optical, or wireless networks (or a combination thereof). The communication may use a variety of data transmission protocols, such as fiber distributed data interface (FDDI), Ethernet, asynchronous transfer mode ("ATM"), or frame relay.

The input/output controller 1030 may also communicate with one or more input devices or peripherals using an interface 1035, such as, but not limited to: a keyboard, a mouse, a touch screen/display input, microphone, pointing device, etc. The input/output controller 1030 may also communicate with output devices or peripherals, such as displays, printers, speakers, headsets, banner displays, etc. These may be used, in part, to receive Administrator input, including for interacting with the manual agent selection module.

The processor 1010 may be configured to execute instructions stored in volatile memory 1040, non-volatile memory 1050, or other forms of computer readable storage media accessible to the processor 1010. The volatile memory may comprise various types of memory technologies, including, but not limited to: random access memory ("RAM"), dynamic random access memory ("DRAM"), static random access memory ("SRAM"), and other forms well known to those skilled in the art. The non-volatile memory may comprise various technologies, including, but not limited to: storage media such as hard disks, floppy disks, read only memory ("ROM"), programmable read only memory ("PROM"), electrically erasable read only memory ("EPROM"), flash memory, and other forms well known to those skilled in the art.

The non-volatile memory 1050 may store program code and data, which also may be loaded into the volatile memory 1040 at execution time. Specifically, the non-volatile memory 1050 may store one or more location monitoring program modules 1053 that may perform the above mentioned process flows and/or operating system code 1052 containing instructions for performing the process and/or functions associated with the technologies disclosed herein. The location monitoring program module 1053 may also access, generate, or store location related data 1055, including the data described above in conjunction with the location monitoring processes, in the non-volatile memory 1050, as well as in the volatile memory 1040. The volatile memory and/or non-volatile memory may be used to store other information including, but not limited to: records, applications, programs, scripts, source code, object code, byte code, compiled code, interpreted code, machine code, executable instructions, or the like. These may be executed or processed by, for example, processor 1010. These may form a part of, or may interact with, the e-learning module 1053.

The technologies described herein may be implemented in various ways, including as computer program products comprising memory storing instructions causing a processor to perform the operations associated with the above technologies. The computer program product may comprise a non-transitory computer readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms). Such non-transitory computer readable storage media include all the above identified computer readable media (including volatile and non-volatile media), but does not include a transitory, propagating signal, nor does it encompass a non-tangible computer readable medium. Non-volatile computer readable storage medium may specifically comprise: a floppy disk, flexible disk, hard disk, magnetic tape, compact disc read only memory ("CD-ROM"), compact disc compact disc-rewritable ("CD-RW"), digital versatile disc ("DVD"), Blu-Ray™ disc ("BD"), any other non-transitory optical medium, and/or the like. Non-volatile computer readable storage medium may also comprise read-only memory ("ROM"), programmable read-only memory ("PROM"), erasable programmable read-only memory ("EPROM"), electrically erasable programmable read-only memory ("EEPROM"), flash memory, and/or other technologies known to those skilled in the art.

CONCLUSION

Many modifications and other embodiments of the concepts and technologies set forth herein will come to mind to one skilled in the art having the benefit of the teachings presented in the foregoing descriptions and the associated drawings. Therefore, it is to be understood that embodiments other than the embodiments disclosed herein are intended to be included within the scope of the appended claims. Although specific terms may be employed herein, they are used in a generic and descriptive sense only and not for purposes of limitation.

The invention claimed is:

1. A method for tracking in a contact center after-call work of an agent by a processor in a schedule adherence system, the method comprising:
    retrieving by the processor in the schedule adherence system a work schedule generated for the agent by a workforce management system, the work schedule indicating a shift of the agent having a start time and a stop time, the shift associated with a single work location, wherein the schedule adherence system is configured to maintain location information of the agent during the shift;
    wirelessly transmitting the work schedule including the start time and the stop time of the shift from the schedule adherence system to a mobile processing device used by the agent;
    receiving a log-in at a call handler in the contact center from the agent, wherein the log-in indicates the agent is ready to receive calls from the call handler;
    in response to receiving the log-in at the call handler, causing a first request for Global Position System ("GPS") location information to be wirelessly sent to the mobile processing device wherein the mobile processing device uses GPS technology;
    receiving an initial reported location data from the mobile processing device wirelessly sent in response to the first request for GPS location information;
    storing the initial reported location data by the processor as a baseline work location;
    causing a second request for GPS location information to be wirelessly sent to the mobile processing device during the shift, wherein the second request for GPS location information is sent when the agent is determined to be engaged in after-call work;
    receiving by the processor a second reported location information wirelessly transmitted from the mobile processing device in response to the mobile processing device receiving the second request for GPS location information;
    comparing by the processor the second reported location information received from the mobile processing device with the baseline work location associated with the single work location of the agent;
    determining by the processor the second reported location information from the mobile processing device exceeds a location deviation threshold with respect to the baseline work location; and
    recording by the processor a non-compliance schedule adherence condition for the agent along with the time in the schedule adherence system.

2. The method of claim 1, wherein the first request is sent during the handling of a call by the agent involving the call handler.

3. The method of claim 1, wherein the first request is sent after a defined time after the log-in of the agent is received.

4. The method of claim 1, wherein the second request for GPS location information is sent in response to an average after-call-work time of the agent exceeding a threshold.

5. The method of claim 1, wherein the first request was sent during a previous shift of the agent and the initial reported location data was received during the previous shift of the agent.

6. The method of claim 1, wherein determining the second reported location information from the mobile processing device exceeds the location deviation threshold with respect to the baseline work location further comprises determining a duration of the non-compliance schedule adherence condition.

7. A non-transitory computer-readable tangible medium storing instructions thereon when executed by a processor cause the processor to:
    retrieve a work schedule generated for an agent by a workforce management system, the work schedule indicating a shift of an agent having a start time and a stop time, wherein the agent works the shift in a single work location, wherein a schedule adherence system is configured to maintain location information of the agent during the shift;
    wirelessly transmit the work schedule including the start time and the stop time of the shift to a mobile processing device used by the agent;
    receive an indication of a log-in at a call handler in a contact center from the agent, wherein the log-in indicates the agent is ready to receive calls from the call handler;
    in response to receiving the log-in at the call handler, cause a first request for Global Position System ("GPS") location information to be wirelessly sent to the mobile processing device wherein the mobile processing device uses GPS technology;
    receive an initial reported location data from the mobile processing device wirelessly sent in response to the first request for the GPS location information;
    store the initial reported location data as a baseline work location of the agent;
    cause a second request for GPS location information to be wirelessly sent to the mobile processing device during the shift, wherein the second request for GPS location information is sent when the agent is determined to be engaged in after-call work;
    receive a second reported location information wirelessly transmitted from the mobile processing device;
    compare the second reported location information received from the mobile processing device with the baseline work location associated with the single work location of the agent;
    determine the second reported location information from the mobile processing device exceeds a location deviation threshold with respect to the baseline work location; and
    record a non-compliance schedule adherence condition for the agent along with the time in the schedule adherence system.

8. The non-transitory computer-readable medium of claim 7, wherein the first request is sent after a defined time after the log-in of the agent is received by the contact center.

9. The non-transitory computer-readable medium of claim 7, wherein the second request for location information is sent after the agent completes a first call and before a disposition code is entered for the first call.

10. The non-transitory computer-readable medium of claim 7, wherein the baseline work location reflects a residence of the agent.

11. The non-transitory computer-readable medium of claim 7, wherein the second request for GPS location information is sent in response to an average after-call-work time of the agent exceeding a threshold.

12. The non-transitory computer-readable medium of claim 7, wherein the first request was sent during a previous shift of the agent and the initial reported location data was received during the previous shift of the agent.

13. The non-transitory computer-readable medium of claim 7, wherein the location deviation threshold is at least three meters.

* * * * *